Dec. 28, 1965 J. D. MALONE 3,226,679

ELECTRONIC SELECTIVE RINGING DECODER SYSTEM

Filed Dec. 12, 1961 3 Sheets-Sheet 1

INVENTOR.
James D. Malone

BY

Paul J. Ethington

ATTORNEY

Dec. 28, 1965 J. D. MALONE 3,226,679

ELECTRONIC SELECTIVE RINGING DECODER SYSTEM

Filed Dec. 12, 1961 3 Sheets-Sheet 2

INVENTOR.
James D. Malone

BY Paul J. Ethington

ATTORNEY

ELECTRONIC SELECTIVE RINGING DECODER SYSTEM

Filed Dec. 12, 1961

3 Sheets-Sheet 3

INVENTOR.

James D. Malone

BY

Paul J. Ethington

ATTORNEY

United States Patent Office 3,226,679

Patented Dec. 28, 1965

3,226,679

ELECTRONIC SELECTIVE RINGING DECODER SYSTEM

James D. Malone, Milwaukee, Wis., assignor to General Motors Corporation, Detroit, Mich., a corporation of Delaware Filed Dec. 12, 1961, Ser. No. 158,709
10 Claims. (Cl. 340—164)

This invention relates to selective signaling systems and more particularly to a selective ringing decoder system responsive to a predetermined call signal.

In communications and control systems with multiple receiving stations, it is a usual practice to utilize common circuits or carrier frequencies for all stations and to employ distinctive call signals for selecting a particular station. In a conventional system, the call signals, much like the well known dial telephone numbers, are represented by different permutations of a group of integers, such as 2 through 10. Typically, a call signal is formed by taking five integers at a time, such as 5–3–2–7–4, to permit a very large number of stations to be selectively operated in the same network.

For transmission, the call signals are encoded by successively alternating an electrical signal between two given frequencies with a number of alternations corresponding to the value of the call signal integer and with a prolonged delay or space between alternations to separate the integer signals. In both wired circuit networks and radio networks, the call signal is encoded by alternate 600 c.p.s. and 1500 c.p.s. tone frequencies with a frequency transition at approximately every 100 milliseconds within an integer signal and a space of approximately 500 milliseconds between successive integer signals. At the receiving station, the call signals are decoded by an electromechanical decoding or selector device responsive to successive trains of electrical pulses, each train corresponding to an integer signal.

Heretofore, the decoder systems have employed an electromechanical pulse forming device which translates each tone alternation into a pulse to develop a single channel of pulse trains. The prior art decoder systems are expensive to manufacture and service and are not well adapted for many applications, particularly mobile radio receivers, because the complex mechanism is heavy and requires excessive space.

Accordingly, it is an object of this invention to provide an improved decoder system which is especially adapted for mobile radio-telephone service, and is compatible with the conventional integer type, alternate tone signal. A copending application to Malone et al., now Patent No. 3,077,577, filed March 16, 1959, has the same object. In accordance with the invention of that application, the tone frequency alternations of the transmitted call signal are translated electronically into a stepping or integer signal pulse train in one channel and a synchronized decoder pulse train in another channel. For this purpose, a frequency selective circuit responsive to the tone frequency alternations develops a control voltage for a trigger generator which controls a pulse generator for producing a train of integer signal pulses for the stepping actuator. The pulse trains are also applied to a decoding control circuit which produces a continuous decoding pulse extending throughout each integer signal and which are applied to a decoder actuator.

The present invention incorporates the teachings of of Malone et al. 3,077,577, and in addition, contemplates that an electronic circuitry be substituted for the code wheel mechanism thereby providing a completely electronic decoder and preferably would comprise an entirely transistorized circuit. Apparatus constructed in accordance with the invention presents many advantages over its electromechanical predecessors. For example, it is comparatively unaffected by vibration and, of course, is not subject to mechanical wear and failure. Since it has no moving parts the decoder according to the invention draws comparatively constant current rather than heavy pulse currents required by the electromechanical devices and therefore can be operated from high impedance, low capactiy power sources, and the problem of providing adequate filtering to remove ripple or transients which may exist at the power sources is much simplified. This electronic device is silent in operation, is capable of much faster operation and has a higher code capacity than the electromechanical code wheel decoders.

The invention is carried out by providing appropriate detector circuits and wave shaping circuits to produce a square wave pulse for each tone transition and a second square wave pulse extending throughout the train of pulses representing each integer. The first group of pulses are fed into a counter which is preset to a state corresponding to the first integer of the call number. At the end of the train of pulses representing the first integer, the counter produces an output indicating whether the correct first integer has been received. Simultaneously the second square wave generates a pulse which will reset the decoder to standby condition if the correct first integer has not been received, but will advance a second counter one step of the correct integer has been received. The second counter then, in effect, registers receipt of the first integer and causes the first counter to be reset to a state corresponding to the second digit of the call number for that station. The cycle is repeated until an incorrect integer has been received causing the decoder to reset or until the correct call number has been completed and registered. When a complete call number is received, the second counter will actuate a switch which in turn will operate a bell or other signal device to indicate the receipt of the correct call number.

The above and other advantages of the present invention will become more apparent from the following specification taken in conjunction with the accompanying drawings wherein like reference numerals refer to like parts, and wherein.

Figure 1:
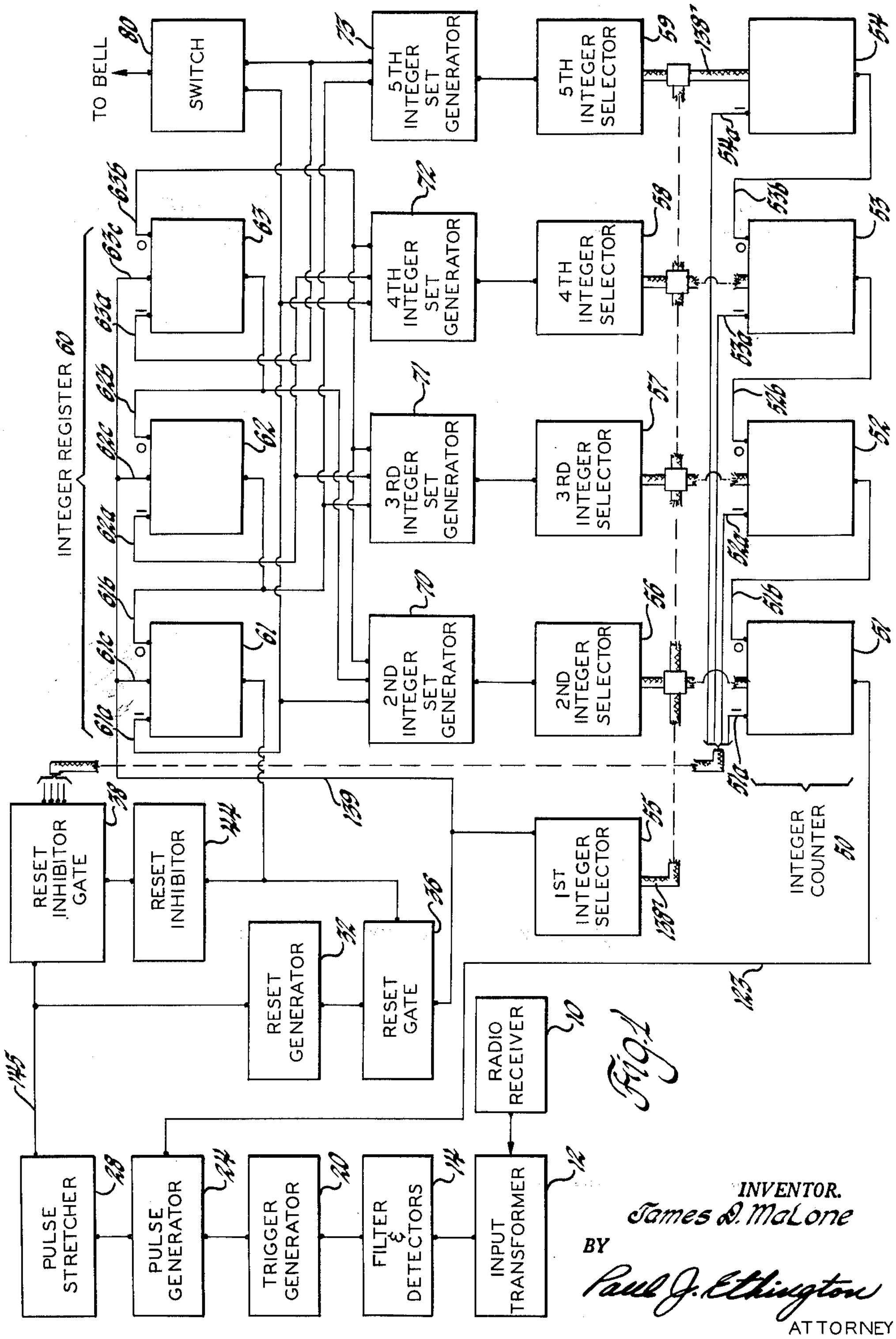
FIGURE 1 is a block diagram of a decoder according to the invention.

Referring now to FIGURE 1, there is shown an illustrative embodiment of the invention in a decoder system adapted to receive call signals in the form of tone frequency alternations and to translate the call signals to pulse form for driving an electronic decoding device. It will be appreciated as the description proceeds that the invention is equally applicable to either radio or wired circuit networks wherein the call signal is transmitted as successive frequency alternations between any two frequency values.

In FIGURE 1, a radio receiver 10, suitably a frequency modulation receiver, is tunable to a carrier wave frequency common to other receivers with similar decoder systems in the same network. To alert the operator of the radio receiver to a forthcoming message transmission, the network utilizes selective ringing wherein each receiver is assigned a call signal represented by a permutation of integers. For simplifying the explanation, it will be assumed that the call signal assigned to this particular receiver is represented by a group of three integers 5–3–2 although the number of integers taken at a time may vary, depending upon the number of receiver stations to be employed in the network. For example, it is a common practice to form the call signals by taking five integers at a time from the group of 2 through 10 in which case the number of usable permutations and hence the number of receiver stations in the same network which may be selectively called exceeds 50,000. In such systems, the integer 1 is reserved for use as a clearing signal whereby all of the decoder systems in the network are reset after each call signal transmission for reception of a succeeding call signal. The transmitter station in such a network may be of conventional type and the call signal is encoded for transmission by modulating the carrier wave with a succession of tone frequency alternations, conventionally 600 c.p.s. and 1500 c.p.s. with a number of tone alternations or transitions corresponding to the value of the particular integer in the call signal.

Figure 2:
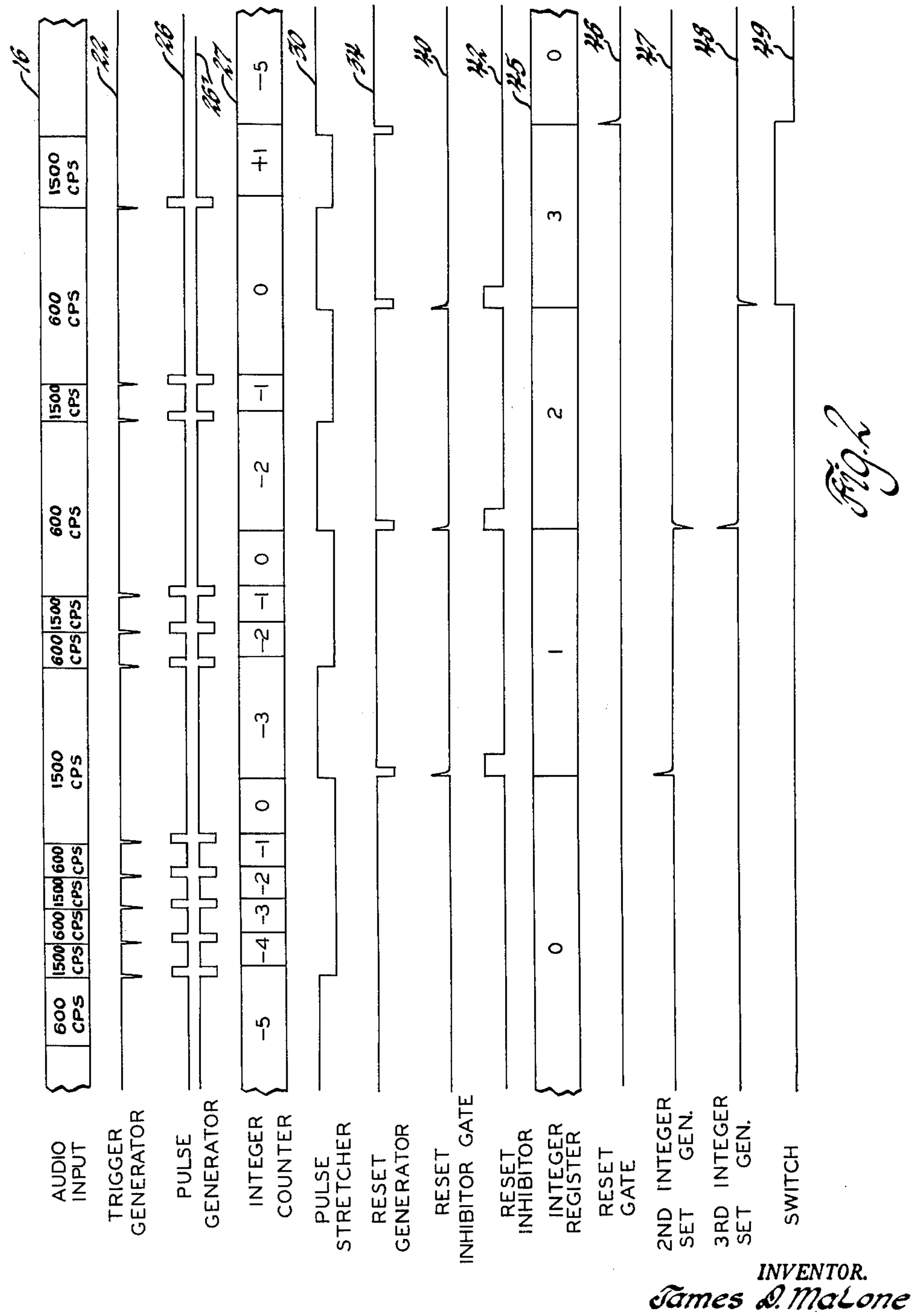
FIGURE 2 is a graphical representation of the electrical signals at selected points in the system.

During the reception of a call signal, the audio output voltage of the receiver 10 alternates between the 600 c.p.s. and the 1500 c.p.s. tones as shown in the block diagram 16 of FIGURE 2. In the call signal, which is illustrated as 5–3–2, the tone frequency within each integral signal changes about every 100 milliseconds and the pause or space between integer signals is about 500 milliseconds. The tone voltage is applied through an input stage or transformer 12 to a frequency selective detector stage 14 which develops an output current of one polarity when the 600 cycle tone predominates and of the other polarity when the 1500 cycle tone predominates and thus, a polarity change occurs at each tone frequency transition. The detector signal is applied to a trigger generator 20 which develops a voltage of rectangular waveform between adjacent tone frequency transitions from which is developed trigger pulses having a waveform 22 and corresponding to each tone frequency transition. The trigger pulses are applied to a pulse generator 24 which develops a pulse corresponding to each trigger pulse to produce a pulse train, represented by waveform 26, for each integer signal. The integer signal pulse trains are applied to a pulse stretcher circuit 28 which develops pulses of waveform 30 extending through each integer signal which are applied to a reset circuit to be described. The pulse generator 24 also produces a second integer signal pulse train 26′ which is opposite in polarity to the pulse train 26 and is applied to an integer counter 50. The circuitry described above is more fully explained in Patent No. 3,077,577.

The remainder of the system comprises the decoder circuitry and includes a reset circuit, an integer counter 50, an integer register 60, and associated circuitry. The output pulse 30 from the pulse stretcher 28 is applied to the reset generator 32. The trailing edge of each pulse 30 triggers the reset generator 32 which produces an output pulse of about 30 milliseconds duration. The output pulse 34 is fed to the reset gate 36. The pulses 30 from the pulse stretcher 28 are also applied to the reset inhibitor 38 which produces an output pulse of waveform 40 except when a positive signal is applied to the inhibitor gate 38 from the integer counter 50. When a pulse is produced by the reset inhibitor gate 38, it is stretched into a pulse of about 60 milliseconds duration, as shown in waveform 42 by the reset inhibitor 44. When the pulse from the reset inhibitor 44 is applied to the reset gate 36 the latter is closed to thereby prevent the reset signal 34 from passing therethrough. However, when there is an input to the reset inhibitor gate 38 from the integer counter 50 thereby signifying that the counter is not in a "0" state, there will be no output from the reset inhibitor gate 38 and there is nothing to prevent an output from the reset gate 36, as shown by waveform 46. When there is no output from the integer counter 50 applied to the reset inhibitor gate 38, then a signal 42 is applied simultaneously to the reset gate 36 and to the integer register 60 where the receipt of the pulse group is recorded. On the other hand, when as signal from the integer counter 50 is applied to the reset inhibitor gate 38 there is an output pulse 46 from the reset gate which is applied to the integer register 60 as well as the integer counter 50 through the first integer selector 55 to reset both the register and the counter to standby condition.

The integer counter 50 is a conventional binary counter including four flip-flop circuits 51, 52, 53, 54, each of which produces a positive voltage at the upper left output lead 51*a*, 52*a*, 53*a*, 54*a* to indicate a state corresponding to "1" and a similar voltage at the upper right output lead 51*b*, 52*b*, 53*b* to indicate a state of "0". A positive pulse applied to the bottom terminal of any of the flip-flop circuits causes a change of state for that circuit. By way of example, if all of the flip-flop circuits are initially set to give an output of "1" and a positive pulse from the pulse generator 24 is applied via the conductor 123 to the bottom of the first flip-flop circuit 51, then that circuit would change to the "0" state thereby causing a positive pulse to be fed through the output lead 51*b* to the bottom of the second flip-flop circuit 52 which again causes a change from the "1" state to a "0" state and so on until all of the four flip-flop circuits are in "0" state. Then a second pulse from the pulse generator 24 would reset the first flip-flop circuit 51 to the state of "1", but the second flip-flop circuit would not be affected since there will be no positive output pulse from the "0" side of the first flip-flop circuit 51. A third pulse from the pulse generator 24 will set the first flip-flop circuit 51 to "0" state which causes a positive pulse to be fed to the bottom of the second flip-flop circuit 52 which will then change to the "1" state, and the remaining flip-flop circuits 53, 54 will not be affected. Then by reading the outputs of the counter from right to left, it will be seen that the counted started with a binary number of "1111" which the first pulse changed to "0000", the second pulse changed to "0001", and the third pulse changed to "0010", which in the decimal system is a change from "15" to "0" to "1" to "2". To clarify the description, however, I prefer to consider "1111" as the decimal integer "—1," "1110" as "—2," etc. Where it is desired to signify the receipt of a train of pulses corresponding to a predetermined integer by a final state of "0", then it is necessary to preset the counter to a state which corresponds to "0" minus the predetermined number. Hence to preset the counter to receive the integer "5", the counter should be set for "—5" or "1110." Then as the five pulses are received, the counter is stepped through the states "1100," "1101," "1110," "1111," and finally "0000."

The presetting of the integer counter is accomplished by the integer selectors 55–59, one being provided for each integer of the call number. Thus the circuit shown in FIGURE 1 is adapted to handle a five integer call number, though for convience FIGURE 2 is illustrated in terms of three integers. Each selector is connected to all flip-flop circuits of the integer counter 50 by a network depicted as a cable 138′ and more clearly illustrated as network 138 in FIGURE 3, and is effective to set the state of each flip-flop circuit to the predetermined integer. As mentioned above, when a train of pulses corresponding to the predetermined integer is received, a pulse from the reset inhibitor 44 is fed to the integer register 60. The register is a binary counter identical to the integer counter 50 except that it comprises only three flip-flop circuits 61, 62, 63. The register 60 is initially set for a state of "000." When the pulse from the reset inhibitor reaches the integer register, the register is changed to state "001," reading from right to left. The three outputs 63*b*, 62*b*, 61*a* from the integer register corresponding to the state of "001" are fed to the second integer set generator 70 which is thereby actuated and serves to energize the second integer selector 56 which resets the integer counter for the second integer call number which, in this case, is "3." Therefore the integer counter is set for the state "1101" and if a three-pulse train or group is received, the integer counter will be changed to the "0000" state as described above and will, by the way of the reset circuit, cause a second pulse to be fed to the integer register. The register then is set to the state of "010." The appropriate register outputs 63_b_, 62_a_, 61_b_ relating to that state are connected to the third integer set generator 71 to cause the third integer selector 57 to be energized to reset the integer counter 50 for the third integer of the call number. The cycle is repeated successively until all integers of the call number are received. When the receipt of the fifth integer is recorder by the integer register 60, the state of the register will be "101" and the "1" outputs 61_a_, 63_a_ of the first and last flip-flops 61 and 63 are fed to to a switch 80 which is energized to actuate a visual or audible signal such as a lamp or bell. The receipt of a subsequent clearing pulse (the integer "1") will cause a reset signal to be issued from the reset gate 36 which will be fed through conductor 139 to the reset terminals 61_c_, 62_c_, 63_c_ of the three flip-flop circuits 61, 62, 63 to thereby reset the register 60 to the state "000." The reset pulse will also go to the first integer selector which presets the integer counter to the state corresponding to the first integer of the call number which we have chosen as the state "1011" corresponding to the integer "5." In the case where an incorrect call number is received, the integer counter will be operated as before. However, at the end of the integer when the reset generator 32 develops a pulse 34, the state of the integer counter 50 will not be "0" and consequently will supply a positive output signal to the reset inhibitor gate 38. Then the gate 38 will be cut off and no signal will be issued by the reset inhibitor 44, but rather there will be an output from the reset gate 36 which acts upon the integer counter 50 and the integer register 60 as described above for the clearing pulse.

Figure 3:
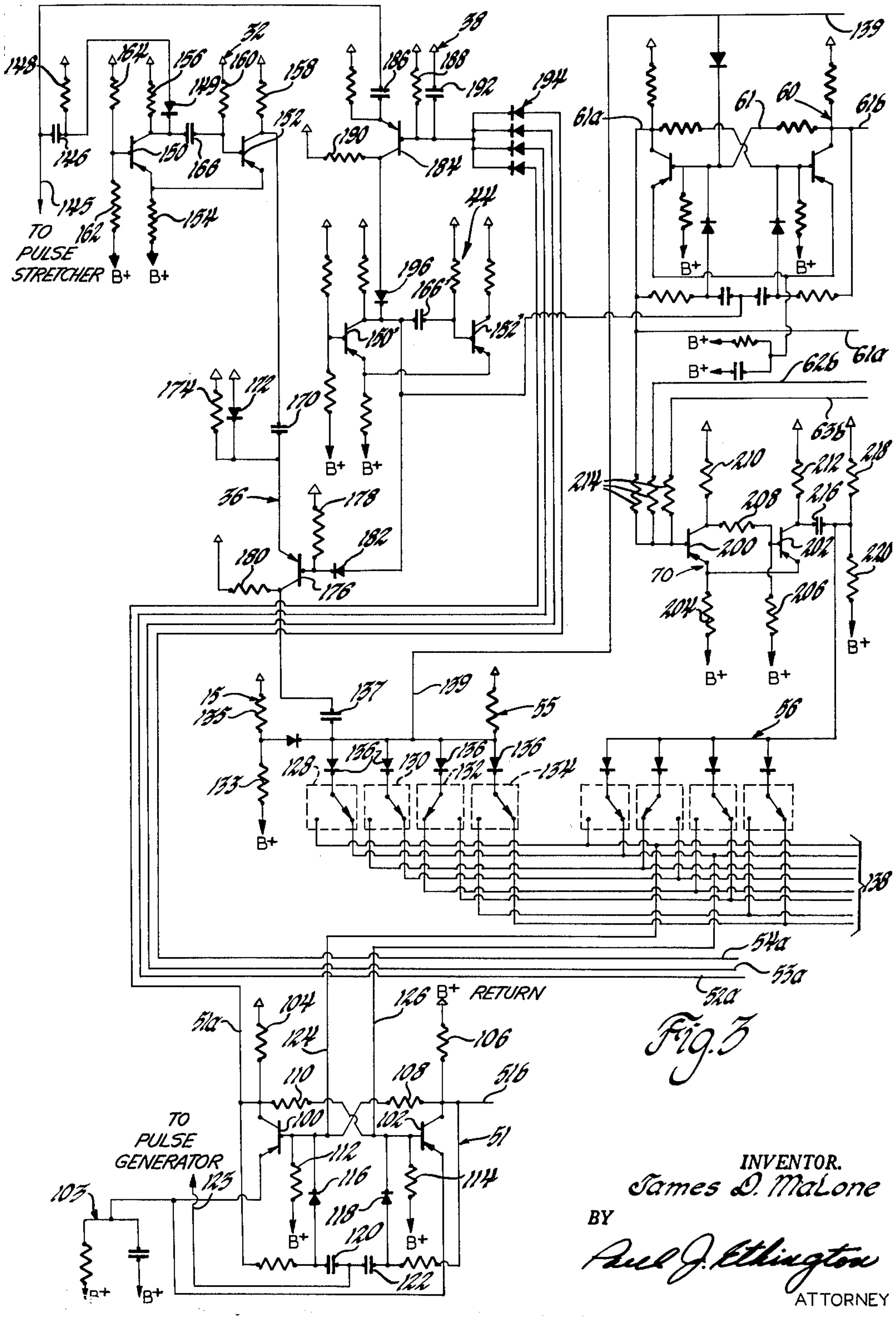
FIGURE 3 is a schematic diagram of a portion of the decoder circuit.

FIGURE 3 is a schematic diagram of the portion of the system which comprises the reset generator 32, the reset gate 36, reset inhibitor gate 38, and the reset inhibitor 44 as well as the first flip-flop circuit 61 for the integer register 60, and second integer set generator 70, the first and second integer selectors 55, 56, and the first flip-flop circuit 51 of the integer counter 50 and the interrelated circuit connections. It is to be understood that the B+ source indicated by the black arrows is the positive terminal of a power supply while the B+ return indicated by white arrows is the return terminal of the same power supply and is not necessarily ground potential.

Referring first to the reset circuitry, the output line 145 from the pulse stretcher 28 leads directly to the reset inhibitor gate 38 and leads also to the reset generator 32 through a differentiating network comprising a capacitor 146 and a load resistor 148 and through a diode 149. The reset generator 32 is adapted to produce a negative pulse corresponding to the trailing edge of the pulse stretcher output signal 30. The reset generator comprises a pair of transistors 150 and 152 connected in a common emitter, monostable multivibrator circuit. The emitters of transistors 150 and 152 are connected with the B+ terminal through the common resistor 154. The collector of transistor 150 is connected to the B+ return through a resistor 156 and the collector of transistor 152 is similarly connected through a resistor 158, of lower value than resistor 156. The base of transistor 152 is connected to the B+ return through the resistor 160 so that in the stable state, the emitter-to-base current biases the transistor 152 to full conduction. The base of transistor 150 is biased positive with reference to the emitter by the voltage divider resistors 162 and 164 connected across the voltage source so that in the stable state, transistor 150 is cut off. The collector of transistor 150 is coupled to the base of transistor 152 through a timing condenser 166. When a trigger pulse from the differentiator is applied to the base of transistor 152 through the condenser 166, the positive potential thereof reduces emitter-to-collector current in transistor 152 which flows through the common resistor 154. This produces a positive-going voltage at the emitter of transistor 150, increasing its emitter-to-collector current and hence the current through resistor 156. Accordingly, the voltage at the emitter of transistor 150 becomes even more positive, increasing the current from emitter to collector until the transistor 150 is fully conductive and transistor 152 is cut off. When the timing condenser 166 is charged to a predetermined value by the positive voltage at the collector of transistor 150, the base of transistor 152 will have become sufficiently negative to permit emitter-to-base current and thus the transistor 152 begins to conduct. Since the resistor 158 in the collector circuit of transistor 152 is of lesser value than resistor 156 in the collector circuit of transistor 150, the voltage at the emitters will become less positive and the conduction of transistor 150 will be cut-off and transistor 152 will become fully conductive. Accordingly, for each trigger pulse applied to the base of transistor 152, a negative pulse is developed at the collector of transistor 150. The pulse width is determined by the timing condenser 166 and the resistor 160 as shown by the waveform 34 (FIGURE 2) and is preferably of about 30 milliseconds duration. The pulse 34 is applied to the reset gate 36 through a condenser 170.

A diode 172 and a resistor 174 arranged in parallel are connected between the B+ return and a point intermediate the condenser 170 and the reset gate 36. The diode 172 charges condenser 170 rapidly during the negative leading edge of the pulse so that the full positive amplitude of the trailing edge is applied to the reset gate 36. Resistor 174 provides a bleed-off path for the condenser 170 when there is no discharge path open through reset gate 36.

The reset gate 36 is a simple transistor switch comprising a transistor 176, a biasing resistor 178 connecting its base to B+ return and a resistor 180 connecting the collector to B+ return. The base of transistor 176 is connected to the reset inhibitor 44 through a diode 182. When no signal is being received from the reset inhibitor 44 the transistor 176 is conductive and the positive pulse received from condenser 170 will pass through the transistor and resistor 180, thereby developing a positive output pulse at the collector which is coupled to the first integer selector. However, when a positive pulse is received from the reset inhibitor 44 it passes through the diode 182 and resistor 178 to impress a positive bias on the base thereby cutting off the transistor 176 and preventing the passage of the reset signal from the reset generator 32.

The reset inhibitor gate 38 also comprises a transistor switch and includes a transistor 184 having its emitter coupled to the output of the pulse stretcher 28 through a condenser 186. The base and collector are connected to B+ return through resistors 188 and 190, respectively. A condenser 192 is in parallel with resistor 188. The four output circuits from the integer counter are each connected to the base of transistor 184 through a diode 194 which isolates each of said circuits from the others. When the integer counter reads zero, no positive signal is applied to the base and the base is more negative than the emitter so that transistor 184 conducts to pass the positive-going trailing edge of the pulse stretcher signal 30 through the resistor 190 to B+ return, thus producing a positive pulse at the collector. When the integer counter is not in its zero state then a positive signal will pass through at least one diode 194 and through resistor 188 thereby impressing a positive voltage on the base to cut off transistor 184.

The reset inhibitor gate 38 is coupled to the reset inhibitor 44 through a diode 196. The reset inhibitor 44 is a monostable multivibrator including transistors 150′ and 152′ and is identical to the reset generator except that the condenser 166′ is larger than condenser 166 so that a longer output pulse will be produced. Preferably the output pulse is of 60 milliseconds duration. The output is taken from the collector of transistor 150′ and hence is a positive pulse, as shown in waveform 42 of FIGURE 2. The output pulse is fed to the base of the transistor 176 of the reset gate 36 as described above and is also fed to the first flip-flop circuit 61 of the integer register 60.

To summarize the operation of the reset circuit, when the pulse stretcher output pulse 30 ends thus indicating that a complete integer has been received, the reset circuit generates an output pulse. When the integer counter 50 is in zero state, signifying that the received integer corresponds to the counter setting, the output pulse is fed to the integer register 60 for recording. When the integer counter is not in zero state, signifying that the received integer did not correspond to the counter setting, then the reset output is fed to the first integer selector and to the integer register to reset the decoder circuit to standby position, ready to receive a subsequent call. Thus, as shown by the waveform diagrams in FIGURE 2, the reset generator 32 produces a pulse 34 at the end of every pulse 30 from the pulse stretcher. At the same time, the reset inhibitor produces pulses 42 providing the digit counter is in zero state. The pulses 42 block the pulses 34 so there is no output pulse 46 from the reset gate 36. But when the integer counter is not in zero state there is no output pulse 42 from the reset inhibitor and the reset generator pulse 34 passes through the reset gate in the form of pulse 46.

Referring now to the flip-flop circuit of the integer counter 50, it will be readily seen that the circuit is conventional and comprises a pair of transistors 100 and 102 each having its emitter connected to a B+ voltage source through a parallel resistor-capacitor arrangement 103 and each having its collector connected to the B+ return through resistors 104 and 106. The base of each transistor 100 and 102 is connected to the collector of the other through resistors 108 and 110, respectively. The base of each transistor is connected through a resistor 112 or 114 to B+ and is also connected through diodes 116 and 118 to condensers 120 and 122, respectively, which have a common junction point forming a terminal for the input from the pulse generator 24. The diodes act as pulse guides and, in conjunction with the resistors the condensers serve as differentiating condensers. When the negative square wave pulse 26′ is fed from the pulse generator 24 into the flip-flop circuit via conductor 123, the negative-going leading edge of the pulse will be prevented from reaching either transistor base, but the positive-going trailing edge will pass primarily through the diode which leads to the base of the conducting transistor since that base has the lower potential. Assuming this to be diode 118, then the pulse will pass through resistors 110 and 104 thereby biasing the base of transistor 102 in the positive direction, tending to cut-off that transistor. As the emitter-collector current decreases, the collector voltage goes negative, and since it is coupled to the base of transistor 100 through the resistor 108, the base of transistor 100 will go negative causing that transistor to conduct. A subsequent pulse from the pulse generator 24 will be fed through diode 116 since it leads to the transistor base of lowest potential and causes transistor 100 to cut off and 102 to conduct. Additional input leads to the flip-flop circuit are 124 and 126 which are connected to the base of transistors 100 and 102, respectively. A positive pulse applied to either of these leads will cause the corresponding transistor to cut off and the opposite transistor to conduct.

Referring now to the first integer selector, it is seen that the selector comprises four double-throw switches 128, 130, 132, and 134 each in series with a diode 136. The stationary contacts of the switch 128 are connected through a network 138 to the leads 124 and 126 of the first flip-flop circuit 51 and similarly, although not shown in detail, the switches 130, 132, and 134 also have their stationary contacts connected with similar leads of the second, third, and fourth flip-flop circuits 52, 53, 54, respectively. Hence when a signal from the reset gate 36 passes through the condenser 137 and through a diode 136 and switch 128, it will then pass to either lead 124 or 126 depending upon the switch position. When the switch is as shown, the lead 126 will receive the reset pulse thereby biasing the base of transistor 102 to cutoff to place the flip-flop circuit in a state of "1" since the transistor 100 will be conducting to provide a positive voltage at its collector. When the movable contact of one of the switches 128–134 is moved to the right, the state of the corresponding flip-flop circuit will be "1," and when moved to the left, the state of the circuit will be "0." It will then be seen that the first integer selector 55 is set for the state "1011" (reading from right to left) which is the correct predetermined setting for the first integer "5" of the call number. Similarly, the second integer selector 56 is set for "1101" corresponding to the integer "3" which is the second integer of the call number. All of the remaining integer selectors 57, 58, 59 are identical to the second integer selector 56 except, of course, the switch positions will depend upon the call number for the particular telephone station.

Referring again to the first integer selector 55, it will be seen that the reset pulse from reset gate 36 will pass through a conductor 139 which is connected to the three flip-flop circuits 61, 62, 63 of the integer register 60 in a manner similar to lead 124 of the first flip-flop circuit of the integer counter. Thus the pulse passing through the conductor 139 serves to set each of the register flip-flop circuits 61, 62, 63 to "0" state. The flip-flop circuits of the register are identical to that described for the counter so that no further description is believed necessary. The voltage divider comprising resistors 133 and 135 connected between B+ and B+ return provides a reference voltage for the reset pulse which is compatible with the operating voltage of the counter and register.

The second integer set generator 70 is identical to the other integer set generators 71, 72, 73 and comprises an "and" circuit (comprising resistors 214 connected to the base of transistor 200) connected to the three flip-flop register circuits 61, 62, 63 and controls a Schmitt circuit which is a transistorized trigger. A pair of transistors 200 and 202 have common emitters connected by a small resistor 204 to B+. The base of transistor 202 is connected to B+ and to the collector of transistor 200 by large resistors 206 and 208. The collectors of the transistors 200 and 202 are connected to B+ return by resistors 210 and 212, respectively. The base of transistor 200 is connected to the three flip-flop circuits of the integer register 60 through resistors 214 and leads 61*a*, 62*b*, 63*b*, so that when the register is in a state corresponding to the receipt of one correct integer ("001") sufficient positive voltage will be applied to the base to cut off the transistor 200. Then the potential of the collector of transistor 200 and the base of transistor 202 which is coupled thereto will go negative causing the latter to conduct as long as the positive potential is applied to the base of transistor 200. When that positive potential is removed the base of transistor 200 will go negative due to its connection to B+ return through the register 60 to cause that transistor to conduct, and transistor 202 to cut off. The output of the Schmitt circuit is taken from the collector of transistor 202 and is fed through a condenser 216 which with its resistive load 218 differentiates the output to provide a positive pulse through the diodes and switches of the second integer selector 56 and to the four stages 51, 52, 53, 54 of the integer counter to preset the counter for the receipt of the second integer of the call number. A voltage divider comprising resistors 218 and 220 across the B+ source maintains the D.C. level of the output at a potential compatible with the counter.

In summary, this invention provides a transistorized decoder which, when used in a radiotelephone system requiring, for example, a five-integer call number, has twenty switches (four for each integer) which set the decoder to respond to a given call number. When the decoder unit is installed at a specific telephone station a technician must manually set the twenty switches in accordance with the call number assigned to that station.

For illustrative purposes in FIGURE 2 this number is taken as 5–3–2 although FIGURE 1 shows a circuit adapted for a five integer number. Assume then that when the decoder unit is in operation it has received a clearing signal so that a reset pulse has been supplied to the first integer selector 55 whereupon the integer counter 50 is preset to "−5" or "1011." The state of the counter is indicated in FIGURE 2 at 27. The reset pulse has also caused the integer register 60 to be set to a state of "000." Then when a transmitted signal comprising a series of audio frequency tone transitions 16 is received by the radio receiver 10, the signal is transformed into a series of pulses 22 (one pulse for each tone transition) and two other corresponding series of square wave pulses 26 and 26'. The first pulse of the pulse train 26 is fed to a pulse stretcher 28 which generates a square wave 30 having a duration exceeding that of the pulse train for one integer. The pulses 26' are fed to the integer counter and the positive-going trailing edge of each pulse causes the counter to change state so that upon the receipt of the fifth pulse the counter is in "0" state. Shortly thereafter the square wave 30 from the pulse stretcher terminates thereby causing pulses 34 and 40 to be issued by the reset generator 32 and the reset inhibitor gate 38. The latter pulse 40 goes to the reset inhibitor 44 which generates a positive output pulse 42 (of duration greater than that of pulse 34) which in turn is fed to the reset gate 36 to block the passage of the pulse 34 therethrough. The pulse 42 is also fed to the integer register which is changed from a state of "0" to a state of "1," as indicated by FIGURE 2 at 45, thereby recording the receipt of the first integer of the call number and simultaneously actuating the second integer set generator 70 which produces an output 47 that in turn is fed through the second integer selector 56 to reset the integer counter 50 to a state of "1101" or "−3." Upon the receipt of a second pulse train comprising three pulses, the cycle is repeated so that the receipt of the second correct integer is recorded by the integer register 60 and the third integer set generator 72 is actuated to produce a pulse 48 to reset the counter 50 to a state of "−2" in readiness for the receipt of the next integer of the call number. When this two-pulse integer is received the integer register 60 will record that event and actuate the switch 80 which produces an output 49 to energize a signaling system. The switch output 49 continues until a clearing pulse is received. The clearing pulse comprises the integer "1" and causes the counter to step to the state of "+1." When the pulse 30 corresponding to the clearing pulse terminates, a signal is produced by the reset generator 32 but no signal is issued from the reset inhibitor gate 38 because the gate is cut off whenever the integer counter is in a state other than "0." Then the pulse 34 from the reset generator passes to the reset gate 36 which issues a reset pulse 46 to return the decoder to standby condition ready to receive the first integer of a subsequent call. If, however, the transmitted call signal was not intended for that particular telephone station and accordingly did not comprise the call number 5–3–2, then when an incorrect integer was received by the decoder the result would be exactly as if a clearing pulse had been received. That is, at the end of the pulse train for that integer the counter 50 would not be in a "0" state and a reset pulse would issue from the reset gate 36 to return the decoder to standby condition.

The above description is given for illustrative purposes only and the scope of the invention is intended to be limited only by the following claims.

I claim:

1. In a selective signaling system using call signals represented by permutations of integers and encoded in a transmitted signal, a receiving station including a decoder circuit for developing from said signal a pulse train comprising several groups of pulses, each group corresponding to one of said integers, first counter means to count the pulses of each group, sequentially energized selecting means electrically connected to said first counter means for presetting the first counter means to states corresponding to the integers of the call number assigned to the station whereby each group of the received signal is compared to the corresponding group of the call signal assigned to the station, second counter means controlled by the outputs of the first counter means to register the receipt of integers corresponding to the call number of the receiving station, and means corresponding to the output of the second counter to indicate the receipt of the complete call number.

2. In a selective signaling system using call signals represented by permutations of integers and encoded in a transmitted signal, a receiving station including a decoder circuit for developing from said signal a pulse train comprising several groups of pulses, each group corresponding to one of said integers, first binary counter means to count the pulses of each group, sequentially energized selecting means electrically connected to said first counter means for presetting the first counter means to states corresponding to the integers of the call number assigned to the station whereby each group of the received signal is compared to the corresponding group of the call signal assigned to the station, second binary counter means controlled by the outputs of the first counter means to register the receipt of integers corresponding to the call number of the receiving station, and means corresponding to the output of the second counter to indicate the receipt of the complete call number.

3. In a selective signaling system using call signals represented by permutations of integers and encoded in a transmitted signal, a receiving station including a transistor decoder circuit for developing from said signal a pulse train comprising several groups of pulses, each group corresponding to one of said integers, first transistor binary counter means to count the pulses of each group, sequentially energized selecting means electrically connected to said first counter means for presetting the first counter means to states corresponding to the integers of the call number assigned to the station whereby each group of the received signal is compared to the corresponding group of the call signal assigned to the station, second transistor binary counter means controlled by the outputs of the first counter means to register the receipt of integers corresponding to the call number of the receiving station, and means corresponding to the output of the second counter to indicate the receipt of the complete call number.

4. In a selective signaling system using call signals represented by permutations of integers and encoded in a transmitted signal, a receiving station including a transistorized decoder circuit for developing from said signal a pulse train comprising several groups of pulses, each group corresponding to one of said integers, binary counter means to count the pulses of each group, second binary counter means to register the receipt of integers corresponding to the call number of the receiving station, reset means responsive to the outputs of said first counter to reset both counters to standby position upon the receipt of integers not corresponding to the call number of the receiving station, a plurality of selecting means for setting said first counter to states corresponding to the integers of the call number, and means responsive to the outputs of said second counter and said reset means for sequentially energizing said selecting means.

5. In a selective signaling system using call signals represented by permutations of integers and encoded in a transmitted signal, a receiving station including a decoder circuit for developing from said signal a pulse train comprising several groups of pulses, each group corresponding to one of said integers, first counter means to count the pulses of each group, a plurality of selecting means comprising manually preset switches for setting said first counter to states corresponding to the integers of the call number whereby the first counter attains a zero state upon the receipt of a correct integer group, second counter means to register the receipt of integers corresponding to the call number of the receiving station, reset means responsive to the outputs of said first counter indicating a nonzero state thereof to reset both counters to standby position upon the receipt of integers not corresponding to the call number of the receiving station, and means responsive to the outputs of said second counter and said reset means for sequentially energizing said selecting means.

6. In a selective signaling system using call signals represented by permutations of integers and encoded in a transmitted signal, a receiving station including a decoder circuit for developing from said signal a pulse train comprising several groups of pulses, each group corresponding to one of said integers, the decoder circuit also developing a reset signal after the termination of each group, first counter means to count the pulses of each group, second counter means to register the receipt of correct integers corresponding to the call number of the receiving station, reset means responsive to the reset signal and to the outputs of said first counter for resetting both counters to standby position upon the receipt of an integer not corresponding to the call number of the receiving station and for actuating the second counter upon receipt of each correct integer, a plurality of selecting means for setting said first counter to states corresponding to the integers of the call number, and means responsive to the output of said second counter and said reset means for sequentially energizing said selecting means.

7. In a selective signaling system using call signals represented by permutations of integers and encoded in a transmitted signal, a receiving station including a decoder circuit for developing from said signal a pulse train comprising several groups of pulses, each group corresponding to one of said integers, the decoder circuit also developing a reset signal after the termination of each group, first binary counter means to count the pulses of each group, second binary counter means to register the receipt of correct integers corresponding to the call number of the receiving station, transistorized reset circuitry responsive to the reset signal and to the outputs of said first counter to reset both counters to standby position upon the receipt of an integer not corresponding to the call number of the receiving station and to actuate the second counter upon receipt of each correct integer, a plurality of selecting means for setting said first counter to states corresponding to the integers of the call number, and means responsive to the output of said second counter and said reset means for sequentially energizing said selecting means.

8. In a selective signaling system using call signals represented by permutations of integers and encoded in a transmitted signal, a receiving station including a decoder circuit for developing from said signal a pulse train comprising several groups of pulses, each group corresponding to one of said integers, the decoder circuit also developing a reset signal after the termination of each group, first counter means to count the pulses of each group, sequentially energized selecting means electrically connected to said first counter means for resetting the first counter means to states corresponding to the integers of the call number assigned to the station whereby each group of the received signal is compared to the corresponding group of the call signal assigned to the station, second counter means to register the receipt of correct integers corresponding to the call signal of the receiving station, a reset generator responsive to the reset signal for producing a reset pulse to reset both counters to standby position upon the receipt of a group of pulses not corresponding to a correct integer of the call signal, a reset inhibitor circuit comprising a gate controlled by the first counter for producing a signal for blocking said reset pulse and for actuating the second counter upon receipt of a group of pulses numerically and sequentially corresponding to an integer of the call signal of the receiving station, and signaling means responsive to the output of said second counter.

9. In a selective signaling system using call signals represented by permutations of integers and encoded in a transmitted signal, a receiving station including a decoder circuit for developing from said signal a pulse train comprising several groups of pulses, each group corresponding to one of said integers, the decoder circuit also developing a reset signal after the termination of each group, first binary counter means to count the pulses of each group, second binary counter means to register the receipt of correct integers corresponding to the call signal of the receiving station, a reset generator comprising a monostable multivibrator responsive to the reset signal for producing a reset pulse to reset both counters to standby position upon the receipt of a group of pulses not corresponding to a correct integer of the call signal, a reset inhibitor circuit comprising a transistor gate controlled by the first counter and a monostable multivibrator for producing a signal for blocking said reset pulse and for actuating the second counter upon receipt of a group of pulses numerically and sequentially corresponding to an integer of the call signal of the receiving station, a plurality of selecting means for setting said first counter to states corresponding to the integers of the call signal, means responsive to the output of said second counter and said reset means for sequentially energizing said selecting means, and signaling means responsive to the output of said second counter for indicating the receipt of the complete call signal.

10. In a selective signaling system using call signals represented by permutations of integers and encoded in a transmitted signal, a receiving station including a decoder circuit for developing from said signal a pulse train comprising several groups of pulses, each group corresponding to one of said integers, the decoder circuit also developing a reset signal after the termination of each group, first binary counter means to count the pulses of each group, second binary counter means to register the receipt of correct integers corresponding to the call signal of the receiving station, a reset generator comprising a monostable multivibrator responsive to the reset signal for producing a reset pulse to reset both counters to standby position upon the receipt of a group of pulses not corresponding to a correct integer of the call signal, a reset inhibitor circuit comprising a transistor gate controlled by the first counter and a monostable multivibrator for producing a signal for blocking said reset pulse and for actuating the second counter upon receipt of a group of pulses numerically and sequentially corresonding to an integer of the call signal of the receiving station, selecting means comprising a plurality of switches for setting said first counter to states corresponding to the integers of the call signal, trigger means responsive to the output of the second counter and said reset means for sequentially energizing said selecting means, and switch means responsive to the output of the second counter for energizing a signal upon receipt of a complete call signal.

References Cited by the Examiner

UNITED STATES PATENTS

| | | | |
|---|---|---|---|
| 2,648,831 | 8/1953 | Vroom | 340—164 |
| 2,669,706 | 2/1954 | Gray | 340—164 |
| 2,929,048 | 3/1960 | Berger et al. | 340—164 |
| 2,973,507 | 2/1961 | Grondin | 340—164 |
| 3,046,526 | 7/1962 | Scantlin | 340—164 |
| 3,064,236 | 11/1962 | Coleman | 340—164 |
| 3,080,547 | 3/1963 | Cooper | 340—164 |

NEIL C. READ, *Primary Examiner.*